US006151504A

United States Patent [19]
Weinhappl

[11] Patent Number: 6,151,504
[45] Date of Patent: Nov. 21, 2000

[54] SYSTEM AND METHOD FOR CONNECTING A COMMUNICATION TERMINAL EQUIPMENT OF A RADIO COMMUNICATION NETWORK AND A FURTHER COMMUNICATION TERMINAL EQUIPMENT

[75] Inventor: Josef Weinhappl, Vienna, Austria

[73] Assignee: Siemens Aktiengesellschaft, Munich, Germany

[21] Appl. No.: 08/994,716

[22] Filed: Dec. 19, 1997

[30] Foreign Application Priority Data

Dec. 20, 1996 [DE] Germany .......................... 196 53 469

[51] Int. Cl.$^7$ ...................................................... H04Q 7/20
[52] U.S. Cl. ............................................ 455/445; 455/428
[58] Field of Search .................................. 455/445, 498, 455/12.1, 13.1, 13.2, 13.3, 427, 429, 430, 422, 450

[56] References Cited

U.S. PATENT DOCUMENTS

| | | | |
|---|---|---|---|
| 5,081,703 | 1/1992 | Lee | 455/13.2 |
| 5,523,997 | 6/1996 | Bishop, Jr. | 455/13.1 |
| 5,603,079 | 2/1997 | Olds et al. | 455/13.1 |
| 5,604,920 | 2/1997 | Bertiger et al. | 455/13.1 |
| 5,654,958 | 8/1997 | Natarajan | 455/445 |
| 5,852,779 | 12/1998 | Sawyer | 455/445 |
| 5,884,179 | 3/1999 | Patel | 455/445 |
| 5,905,952 | 5/1999 | Joensuu et al. | 455/433 |
| 5,930,708 | 7/1999 | Stewart et al. | 455/428 |
| 5,930,715 | 7/1999 | Chambers | 455/445 |

FOREIGN PATENT DOCUMENTS 195 21 374  12/1995  Germany .

OTHER PUBLICATIONS

D. Otto et al. "Iridium—eine Vision wird Wirklichkeit", Siemens Telecom Report, vol. 18, No. 2, 72–74 (1995).

*Primary Examiner*—Reinhard J. Eisenzopf
*Assistant Examiner*—Duc Nguyen
*Attorney, Agent, or Firm*—Hill & Simpson

[57] ABSTRACT

A telecommunication system whereby a switching and control point controls the useful channels via at least one radio transmission unit which has a useful channel connection message for a useful channel connection communicated to it from the switching center. The useful channel connection message contains at least a switching point address and a channel address for the useful channel identification that were previously offered by the switching center. The switching and control point interprets the useful channel connection message and decides whether connection control is initiated via the radio transmission unit in the radio communication network and a useful channel connection between communication terminal equipment is conducted via the radio transmission unit for the transmission of useful information in the identified useful channel.

15 Claims, 4 Drawing Sheets

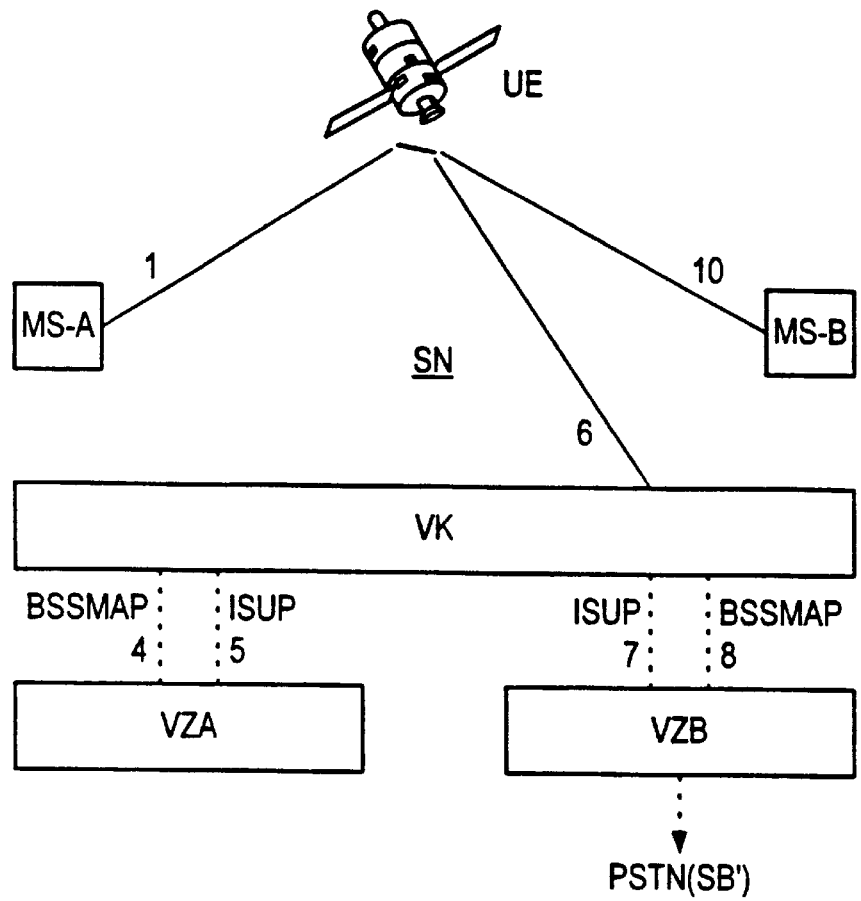
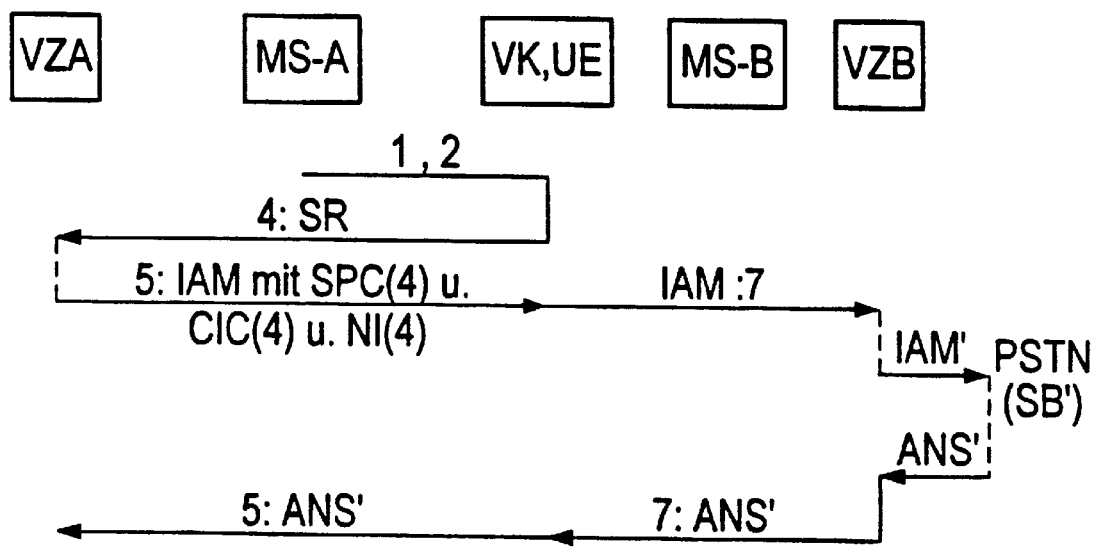

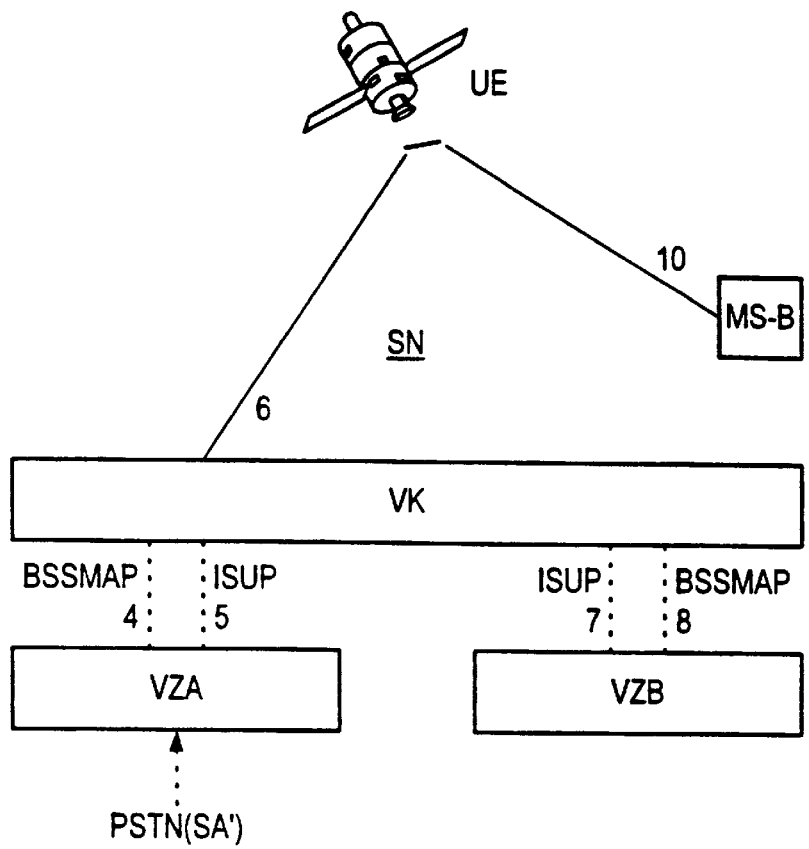
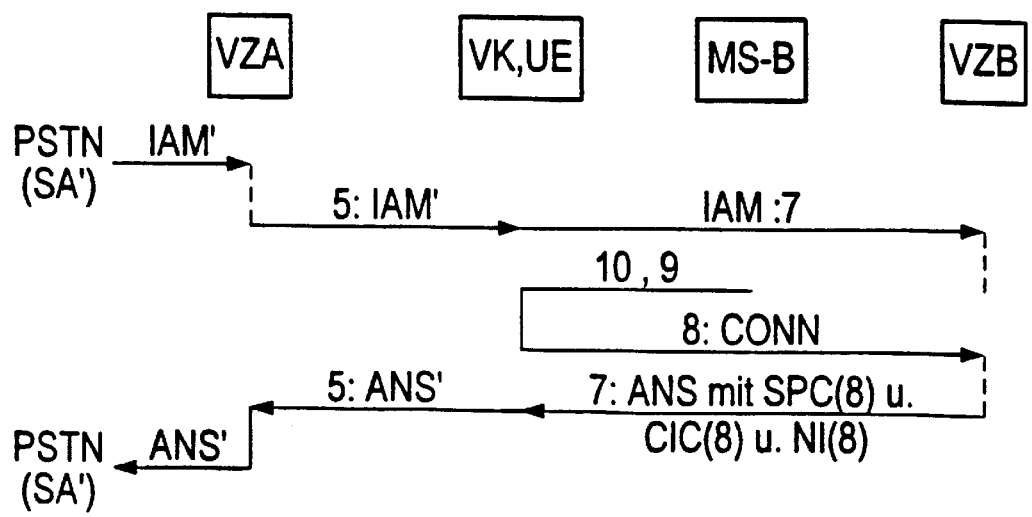

SYSTEM AND METHOD FOR CONNECTING A COMMUNICATION TERMINAL EQUIPMENT OF A RADIO COMMUNICATION NETWORK AND A FURTHER COMMUNICATION TERMINAL EQUIPMENT

BACKGROUND OF THE INVENTION

1. Field of the Invention

The present invention relates generally to the field of telecommunications systems, and more particularly, the present invention relates to an improved system and method for connecting telecommunications equipment.

2. Description of the Related Art

There are known radio communication networks which have at least partially wireless communication connections and public or private communication networks with wired communication connections. Communication systems that use radio communication networks comprise switching centers, switching and control locations, radio transmission units and communication terminal equipment that can be connected to one another in a great variety of ways.

A satellite communication system known from the article "Iridium—eine Vision wird Wirklichkeit", Detlef Otto, Sigurd Schuster, Siemens telcom report 18 (1995), No. 2, represents such a radio communication network content of which is incorporated by reference. In this system, communication terminal equipment are provided for dual operation in the GSM mobile radio telephone network and in the satellite communication system. In addition to the capability of communicating in the GSM mobile radio telephone network, a communication terminal equipment can also set up a communication connection to a further communication terminal equipment via a satellite radio transmission unit. Alternatively, the communication terminal can be called by this further communication terminal equipment regardless of whether the further communication terminal equipment is connected via a public communication network, a mobile radio telephone network or satellite communication network.

Connections from the satellite or satellites to the communication terminal equipment as well as to one another and to at least one terrestrial switching and control location can be set up. The switching and control location is connected to at least one switching center, whereby the switching centers serve as transit or bridge nodes to further networks such as the public telephone network or a GSM network.

German Published Application DE 195 21 374 A1 discloses a communication network with satellites, terrestrial terminal control units and switching centers, whereby an intra-switching of two correlating communication paths takes place in the satellite. To that end, it is necessary that the switching center of the terrestrial terminal control unit signals the identity of the two communication paths in a correlation message. The signaling message, however, is not sufficient in order to switch beyond the intra-switching satellite.

An earlier patent application (P 195 26 415.0-31) has disclosed a pure signaling method wherein the switching center sends, among other things, identification data that are specifically associated with a radio communication in the correlation information. The data is sent to the switching and control location. The transmission of the signaling information takes place according to the central signaling system No. 7 (CCS7) on an interface that is employed in addition to the A-interface between switching center and the switching and control location. A control part SCCP of the CCS7 signaling system used for signaling transactions thereby stops at the communication of the correlation message or, respectively, the correlation information contained therein.

In order to be able to support the CCS7 signaling system in the satellite communication system for the aforementioned function, the control part SCCP must be fashioned as an independent, new sub-system in addition to the control part designed for the terrestrial GSM mobile radio telephone network. It is thereby standard that the control part SCCP for the transmission of the correlation information comprises no useful channel reference whatsoever but assumes the signaling function only for signaling connections. One object underlying the present invention is comprised in reducing the signal running times for transmission of useful information in the useful channels in the communication network an thereby fashioning the call control more simply.

SUMMARY OF THE INVENTION

One aspect of the invention is in the useful-channel-referred connection control, whereby a useful channel connection message for a useful channel connection is communicated from a switching center to the switching and control location that controls the useful channels in at least one radio transmission unit. The independent control part (additional, new SCCP) designed only for signaling can thus be eliminated. This results in a lower outlay, lower costs and more flexibility in the connection control.

The useful channel connection message contains at least one switching point address and a channel address for useful channel identification that were previously offered by the switching center. The switching and control location evaluates the useful channel connection message and decides whether connection control is initiated via the radio transmission unit in the radio communication network and whether a useful channel connection is maintained between communication terminal equipment via the radio transmission unit for the transmission of useful information in the identified useful channel. In the case of the aforementioned call setup, this means that the useful channel need not be set up to and from the switching center. Rather, the switching and control location can directly control the connection between the communication terminal equipment via the radio transmission unit or units in useful-channel-referred fashion. Unnecessary switching events in the switching center and long signal running times are thus avoided.

The switching control by the switching and control location is advantageously developed in such a way that the transmission of the useful channel connection message is implemented upon utilization of a user part for switched user channel connections according to the central signaling system No. 7. It has thereby proven beneficial to transmit the useful channel connection message upon utilization of an ISDN user part (ISUP). The transmission of the useful channel connection message upon utilization of a telephone user part (TUP) is likewise advantageous.

It has also proven beneficial for the connection control in a further development of the inventive method to enter the channel address of the useful channel in a part of the useful channel connection message provided for national data. An alternative aspect of the invention is similarly advantageous wherein the useful channel connection message is separately transmitted as a national message in which the channel address of the respective useful channel is contained. Both transmission types have a low outlay since, for example, given employment of the ISDN user part (ISUP), national parameter in the messages or separate national messages for useful-channel-referred connections are possible. For example, only the channel address of the useful channel need be transmitted as a national parameter or in a national message. Thus the switching and control location can initiate the connection control for the direct useful channel connection via the radio transmission unit or units.

The inventive method is particularly suitable when the radio communication network is embodied as a satellite communication system. In such a system, a satellite functions as a radio transmission unit and the switching and control location are designed as ground stations. The long signal running times and the tight switching-oriented resources in satellite communications systems require a particularly rational procedure when switching useful information. This means that the useful information is not to be switched via the switching centers and switching and control points but between the satellites as much as possible. The signaling required for this connection control is supported according to the invention in the framework of the low-outlay, useful-channel-referred connection control.

A mobile radio telephone-oriented interface can, for example, serve for the transmission of information between the switching center and the switching control point. For example, the A-interface is known from GSM mobile radio telephone systems. The useful channel connection message is advantageously sent and received in addition to the usual information, being sent and received via the same interface and not via a separate interface (I-interface)—as with employment of the independent (SCCP) control part.

BRIEF DESCRIPTION OF THE DRAWINGS

An exemplary embodiment of the inventive radio communication system is explained in greater detail below with reference to drawings wherein:

FIG. 3 illustrates the satellite communication system with through-connection of a useful channel connection;

FIG. 4 illustrates the satellite communication system with a useful channel connection after a connection control between a fixed communication terminal equipment and a mobile communication terminal equipment;

FIG. 6 is a flow chart of the connection control between a mobile communication terminal equipment of a radio communication network and a fixed communication terminal equipment of a public communication network; and FIG. 7 is a flow chart of the connection control between a fixed communication terminal equipment of a public communication network and a mobile communication terminal equipment.

DETAILED DESCRIPTION OF THE PREFERRED EMBODIMENTS

Figure 1:
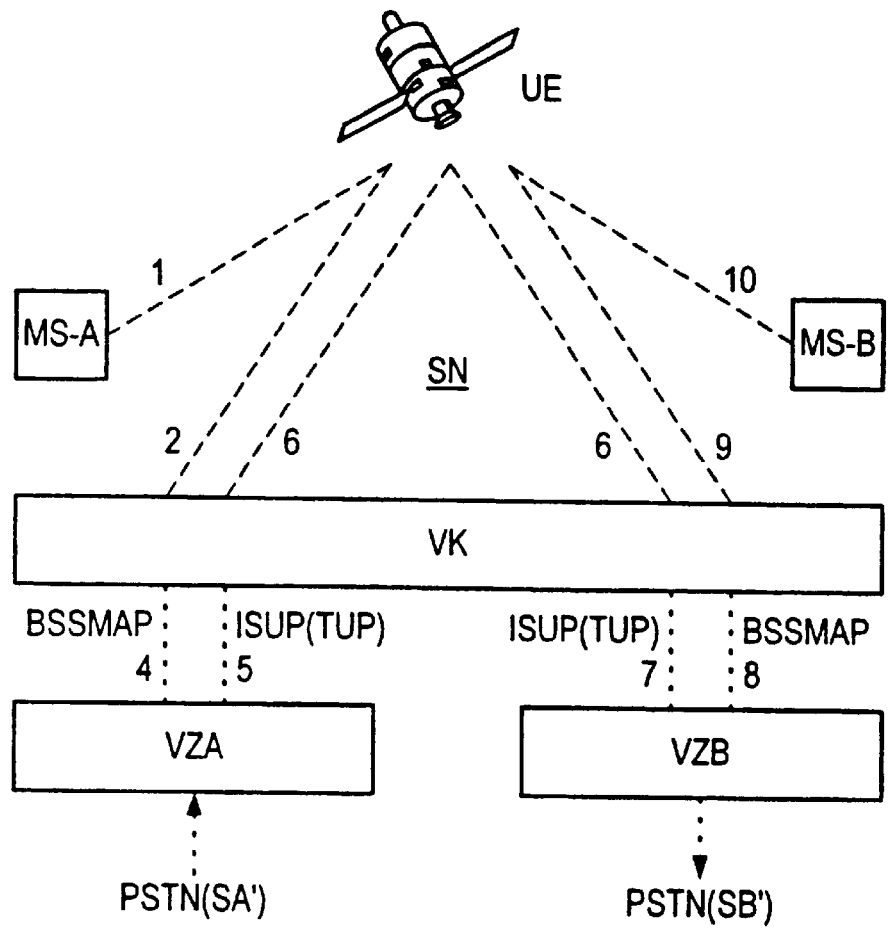
FIG. 1 is a schematic illustration of a satellite communication system with optional call control between mobile and fixed communication terminal equipment.

The radio communication system presented in FIG. 1 illustrates the example of a satellite communication system SN which comprises at least one satellite UE that acts as radio transmission unit and is preferably wirelessly connected to other satellites. It further comprises communication terminal equipment MS-A and MS-B that can be respectively wirelessly connected to the satellite UE. These are typically mobile communication terminal equipment. It is also possible to produce connections via the satellite communication system SN to one of the mobile communication terminal equipment MS-A and MS-B is fixed communication terminal equipment SA' or SB' that, for example, are connected to the public telephone network PSTN. At least one switching and control point VK as ground station and at least two switching centers VZA and VZB as network access nodes likewise belong to the satellite communication system SN. The switching centers VZA and VZB can be networked with one another or not, whereby at least one of these switching centers VZA, VZB in the present example enables connections to a public communication network, to the public telephone network PSTN in the present example.

The switching centers VZA, VZB are connected to the switching and control point VK. This may be through, for example, a mobile radio telephone-oriented interface (A-interface according to the GSM standard for mobile radio telephone network). Signaling information and useful information can be fundamentally transmitted over this connection. The transmission of useful information between the switching centers VZA, VZB is not provided according to the depicted communication system.

In the inventive radio communication system, on the contrary, there is the possibility for every switching center VZA or VZB to communicate a useful channel connection message for a useful channel connection to the switching and control point VK with respect to the connecting paths between two communication terminal equipment MS-A, MS-B, SA', SB'. The transmission of the useful channel connection message thereby advantageously takes place upon utilization of a user part for switched useful channel connections according to the central signaling system No. 7 (CCS7). This, for example, can thereby be a matter of the ISDN user part ISUP or a matter of the telephone user part TUP. A control point application part located in the switching and control point VK and in the switching centers VZA band VZB generates and evaluates mobile radio telephone-oriented signaling information for supporting the communication on the interface.

In the previous connection control, signaling can be carried out between the mobile communication terminal equipment MS-A and the satellite UE via a wireless interface 1. Signaling between the satellite UE and the switching and control point VK takes place via a wireless interface 2. Signaling between the switching and control point VK and the switching center VZA takes place via a wired interface 4 and back via a wired interface 5. When the elected destination can be reached again via satellite, signaling is again carried out between the switching and control point VK and the satellite UE and back via a wireless interface 6. Signaling also takes place from the switching and control point VK to the switching center VZB via a wire-bound interface 7 and back via a wire-bound interface 8, as well as from the switching and control point VK to the satellite UE via wireless interface 9. It also takes place from the latter, to the mobile communication terminal equipment MS-B via a wireless interface 10.

In order to bypass this connection control that is unfavorable with respect to running time, occupation of the useful channels and utilization of the satellite resources, the useful channel connection is switched directly in the satellite UE by the switching and control point VK. For the connection control related to useful channels according to the invention, the useful channel connection message that is generated by the switching center VZA or VZB is sent via the interface 5 or 7 according to the ISDN user part ISUP or the telephone user part TUP. It contains at least a switching point address of the mobile communication terminal equipment MS-A or MS-B and a channel address for the identification of the useful channel. Preferably, a network information for the identification of the communication network is also co-transmitted.

The switching center VZA determines the switching point address, the channel address and the network identifier on the basis of data specifically associated with the radio communication network. These data have arrived previously via the interface 4 or 8 according to the control point application BSSMAP. Specifically, the channel address potentially supplemented by the switching point address and the network identifier—is sent as national datum in the useful channel connection message according to ISUP or TUP or as national message according to ISUP or TUP. This is especially advantageous since the user part—according to CCS7—allows the definition of national parameters or national messages and, thus, additional measures for signaling the direct connection control can be eliminated.

This may be, for example, the operation of a new signaling control part SCCP. Upon reception of the useful channel connection message, the switching and control point VK decides whether connection control is initiated via the satellite UE in the radio communication system SN and whether a useful channel connection for the transmission of useful information between the communication terminal equipment is conducted via the satellite UE based on the received channel address. When this is the case, the switching and control point VK reconfigures the standard connection control such that the useful channel connection—after evaluation of the channel address—is produced directly from the mobile communication terminal equipment MS-A to the mobile communication terminal MSB or to the fixed communication terminal equipment SB' via satellite in order to transmit useful information. Likewise, the useful channel connection can be conducted via satellite from the mobile communication terminal equipment MS-B to the fixed communication terminal equipment SA'. Preferably, the useful channel connection message is sent by the switching enter VZA or VZB only when the useful-channel-referred connection control for a useful channel connection via the satellite UE can be fundamentally implemented by the switching and control point VK.

This schematic illustration in FIG. 1 merely represents a simplified satellite communication system that can also comprise a greater plurality of satellites UE, switching and control points VK and switching centers VZ for a large or global area coverage. The method can also be applied to a radio communication system having a bipartite radio transmission unit. This may be, for example, a satellite with a plurality of radiation lobes or radio transmission receivers of a base station in mobile radio telephone networks having a plurality of radiation lobes, and having one or more switching and control points or, respectively, switching centers. Frequency bands are allocated to the wireless communication connections from and to the satellite or, respectively, between the satellites UE. For example, the K-band may be used for the connection between switching and control point VK and satellite UE and the L-band may be used for the communication connection between satellite UE and communication terminal equipment MS-A, MS-B and between plurality of satellites UE.

Figure 2:
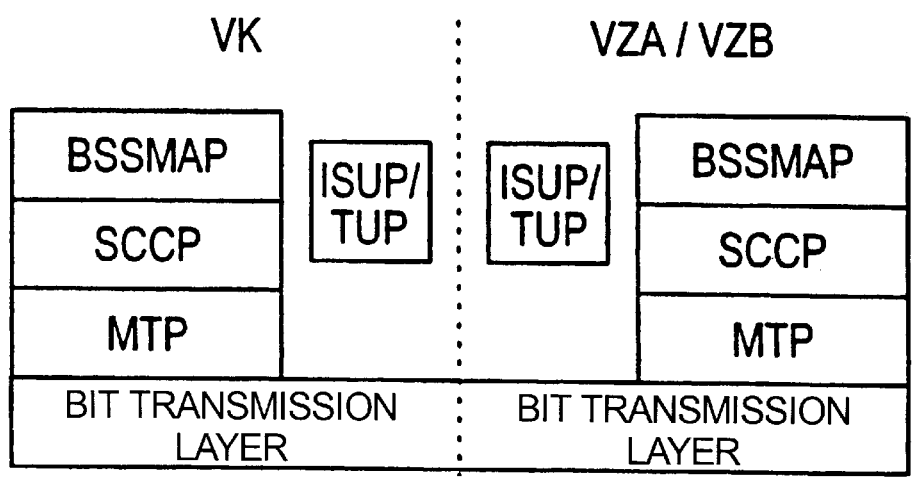
FIG. 2 illustrates the interface for the useful-channel-referred transmission of information.

By way of example, FIG. 2 shows a development of the interface between switching center VZA, VZB and switching and control point VK known by the GSM mobile radio telephone network. The central signaling system No. 7 (CCS7) is employed for the transmission of the information. Based on a bit transmission layer, a message transmission part MTP, a control part and a control point application part BSSMAP are respectively usually employed at both sides of the interface.

According to the invention, the ISDN user part ISUP or the telephone user part TUP is respectively additionally added parallel thereto. This is done so that the switching centers VZA, VZB and the switching and control point VK communicate with one another thereover. The user parts ISUP, TUP respectively have a useful channel reference since they are utilized for switched useful channel connections, and see to the transmission of the useful channel connection message with the switching point addresses, channel addresses and network identifiers determined by the switching center VZA, VZB.

The signaling information can be transmitted therein either as national data in the messages or as national messages, so that it has proven beneficial to enter at least the channel address of the useful channel for the useful channel connection to the respective mobile communication terminal equipment in a part of the useful channel connection message provided for national data. Alternatively, it is beneficial to transmit the useful channel connection message as a national message with the channel address of the respective useful channel. In the switching and control point VK and in the switching center VZA, VZB, the control point application part BSSMAP serves the purpose of generating and evaluating the signaling information of the mobile radio telephone-oriented interface.

FIG. 3 shows the satellite communication system SN after the reconfiguring of the connection control. A connection control from the mobile communication terminal equipment MS-A via the satellite UE either to the mobile communication terminal equipment MS-B or to the fixed communication terminal SB' was initiated in the radio communication system SN by the switching and control point VK. This means that a useful channel connection is activated between the mobile communication terminal equipment MS-A and the satellite UE via the wireless interface 1 and between the satellite UE and the mobile communication terminal equipment MS-B via the wireless interface 10.

For the other case, the useful channel connection is implemented between the mobile communication terminal equipment MS-A and the satellite UE via the wireless interface 1, between the satellite UE and the switching and control point VK via the wireless interface 6 and from the latter to the switching center VZB [via] the wire-bound interface 7. The connection to the fixed communication terminal equipment SB' of the public telephone network PSTN is subsequently set up by the switching center VZB.

FIG. 4 shows the satellite communication system SN after the reconfiguring of the connection control by the switching and control point VK for the case wherein a useful channel connection is to be made from the fixed communication terminal equipment SA' of the publc telephone network PSTN to the mobile communication terminal equipment MS-B. For the transmission of the useful information, the switching and control point VK thereby switches the useful channel connection, which proceeds from the fixed communication terminal equipment SA' via the wire-bound interface 5 to the switching and control point VK, to the satellite UE via the wireless interface 6 and—from the satellite UE—directly to the mobile communication terminal equipment MS-B via the wireless interface 10.

Figure 5:
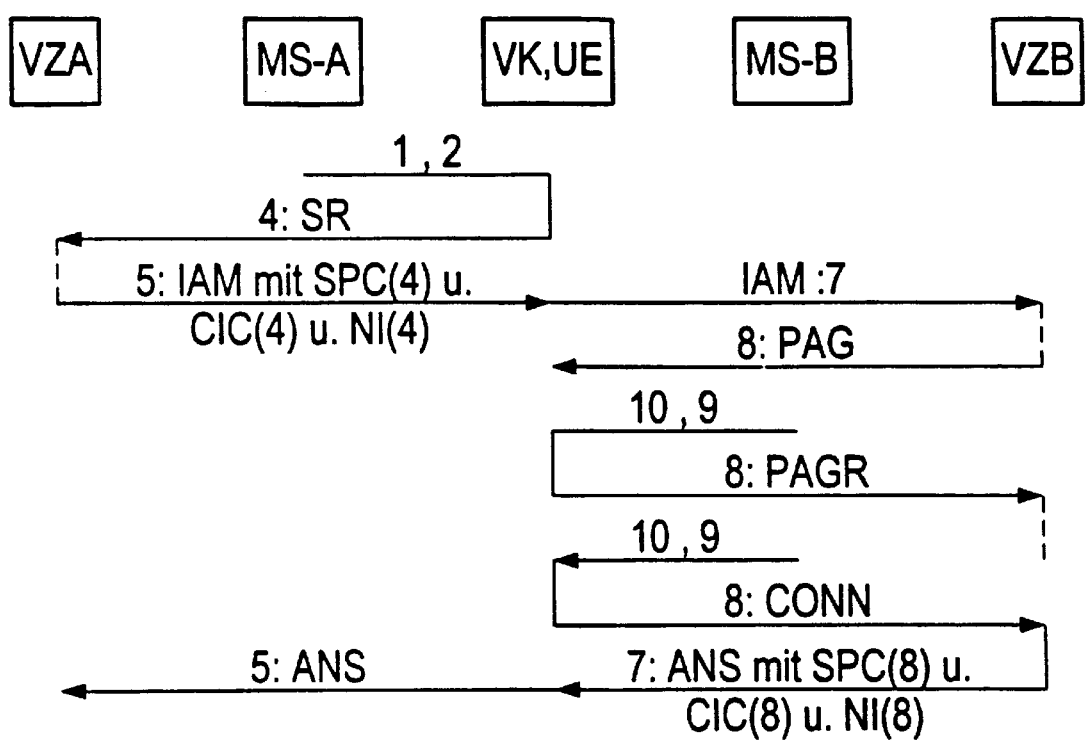
FIG. 5 is a flow chart of the connection control between a mobile communication terminal equipment of a radio communication network and a further mobile communication terminal equipment.

By way of example, FIG. 5 shows a flow chart of the useful-channel-referred connection control between the mobile communication terminal equipment MS-A of a radio communication network and the further mobile communication terminal MS-B. The numerals refer to the respective interfaces according to FIG. 1 via which the communications and messages proceed between the elements of the exemplary satellite communication system. First, an inquiry SR for processing a connection setup ensues from the communication terminal equipment MS-A via satellite UE to the switching and control point VK via the interfaces 1 and 2 and, therefrom, to the switching center VZA via the interface 4. The exchange of messages occurs subsequently, these not being shown in detail since they are known from the terrestrial mobile radio telephone system. At the end, the request of the switching center VZA to the switching and control point VK to sign a connection to it ultimately resides thereat, this being confirmed by the switching and control point VK.

The switching center VZA can receive data from the signaling messages via the interface 4 that are specifically related to the radio communication network, deriving a switching point address SPC (4) (signaling point code) and a channel address CIC (4) (circuit identity code) as well as a network identifier NI (4) therefrom and sending them out in the useful channel connection message IAM via the interface 5. This is possible in a simple way since the useful channel identification both on the signaling connection from/to the mobile communication terminal equipment MS-A (BSSMAP on interface 4) as well as on the signaling connection to the interworking point according to the user part (ISUP on interface) takes place by indicating at least the switching point address and the channel address, potentially supplemented by the network identifier.

The useful channel connection message IAM with the switching point address SPC (4), the channel address CIC (4) and the network identified NI (4) proceeds from the switching and control point VK to the switching center VZB via the interface 7 according to the ISUP user part. As with the connection setup, the switching center VZB determines information about the location of the call communication terminal equipment MS-B. To this end, a home register having information about a destination switching center VZ (not shown) whose area the communication terminal equipment MS-B is located at the moment is interrogated.

The signaling of the communication terminal equipment MS-B is initiated with the paging signal PAG via the interface 8 and the satellite UE. The communication terminal equipment MS-B reacts to the paging signal via the interfaces 10 and 9, so that a confirmation signal PAGR (paging response) for call confirmation is returned from the control and switching point VK to the switching center VZB. The switching center VZB supplies the switching and control point VK with a ringing tone signal for the connection setup. When the communication terminal equipment MS-B signals the institution of a connection via the interfaces 10 and 9, the switching and control point VK sends a connection signal CONN (connect) to the switching center VZB via the interface 8.

The switching center VZB receives data specifically associated with the radio communication network from the signaling messages conducted by the interface 8. This forms the switching point address SPC (8), the channel address CIC (8) and the network identifier NI (8) therefrom and transmits them in the useful channel connection message ANS via the interface 7. From the interface 5 to the interface 7 and back, the communication can proceed either directly in the switching and control point VK or can additionally proceed via the satellite UE. The switching center VZB acknowledges the creation of the connection to the communication terminal equipment MS-B to the switching and control point VK with the useful channel connection message ANS. Alternatively thereto, it is also possible to send a useful channel connection message with the above parameter that identifies the creation of the connection and the beginning of the call or the beginning of a data transmission.

In any case, an evaluation of the national parameters takes place in the switching and control point VK, i.e. of the switching point addresses SPC (8), SPC (4) and of the channel addresses CIC (8), CIC (4) and of the network identifiers, insofar as they are present. In response thereto, it initiates the call control for the useful channel connection via the satellite UE in order to be able to directly transmit the useful information between the mobile communication terminal equipment MS-A and the mobile communication terminal equipment MS-B via the satellite UE—see FIG. 3.

Since it is incumbent upon the switching and control point VK to through-connect the useful channel connection directly in the satellite UE or not, and since the switching central VZA work; independent thereof, the useful channel connection message ANS or the above-described, alternative useful channel connection message is sent as a reply from the switching and control point VK to the transmitted useful channel connection message IAM, being sent to the switching center VZA via the interface 5.

By way of example, FIG. 6 shows a flow chart of the useful-channel-referred connection control between the mobile communication terminal equipment MS-A of a radio communication network and the fixed communication terminal equipment SB' in place of the mobile communication terminal equipment MS-B. The numerals again refer to the respective interfaces according to FIG. 1 via which the communications and messages between the elements of the exemplary satellite communication system proceed.

In the same way as the message execution just described, the useful channel connection message IAM generated by the switching center VZA with the switching point address SPC (4) and the channel address CIC (4) and the network identifier NI (4) is sent via the interface 5 to the switching and control point VK and is sent from the latter to the switching center VZB directly via the interface 7 or via the satellite UE.

In response thereto, the switching center VZB generates a start address message IAM' to the next switching node in the public telephone network PSTN. Given a successful communication attempt to the fixed communication terminal equipment SB', an address completion message ANS' is returned therefrom. The switching center VZB informs the control and switching point VK about the connection to the fixed communication terminal equipment SB' in that it forwards the address completion message ANS' via the interface 7 to the control and switching point VK. Just as in the above-described example, an evaluation of the existing switching point address and channel address and network identifier flows, i.e. SPC (4) and CIC (4) and NI (4), in the switching and control point VK, which subsequently initiates the connection control for the useful channel connection via the satellite UE in order to be able to directly transmit the useful information via satellite UE with the useful channel connection between the mobile communication terminal equipment MS-A and the fixed communication terminal equipment SB'—see FIG. 3. The address completion message ANS' is sent via the interface 5 to the switching center VZA from the switching and control point VK as reply to the useful channel connection message IAM that was sent out.

By way example, FIG. 7 shows a flow chart of the useful-channel-referred connection control between the fixed communication terminal equipment SA' of a public communication network and the mobile communication terminal equipment MS-B. The numerals refer to the respective interfaces according to FIG. 1 via which the messages and communications proceed between the elements of the exemplary satellite communication system. Differing from the above-described message sequences, the connection setup proceeds in the public telephone network PSTN via a start address message IAM', whereupon the switching central VZA identifies the current location of the call communication terminal equipment MS-B from the home register of said communication terminal equipment MS-B and determines the destination switching center (interrogation).

The start address message IAM' is therefore transmitted via the interface 5 to the switching and control point VK and is transmitted from the latter to the switching center VZB by the interface 7. The rest of the signaling ensues as explained for FIG. 5. The signaling of the call communication terminal equipment MS-B is initiated by the switching center VZB with the paging signal. A call confirmation of the mobile communication terminal equipment MS-B arrives at the switching center VZ via the control and switching point VK.

As soon as the set up of a connection is signaled by the communication terminal equipment MS-B via the interfaces 10 and 9, the switching and control point VK sends the connection signal CONN (connect) to the switching center VZB via the interface 8. The switching center VZB receives data specific to the rated communication network from the signaling messages conducted via the interface 8. This forms the switching point address SPC (8) and the channel address CIC (8) and the network identifier NI (8) therefrom and transmits them in the useful channel connection message ANS via the interface 7.

With the useful channel connection message ANS, the switching center VZB confirms the creation of the connection to the communication terminal equipment MS-B to the switching center VZB. A useful channel connection message that is alternative thereto and additionally signals the beginning of a call or of a data transmission can likewise be sent. This is followed by an evaluation of the switching point address SPC (8) and channel address CIC (8) and network identifier NI (8) in the switching and control point VK. This subsequently initiates the connection control for the useful channel connection via the satellite UE in order to be able to transmit the useful information directly between the fixed communication terminal SA' and the mobile communication terminal equipment M-SA and the mobile communication terminal equipment MS-B via the satellite UE-see FIG. 6.

The switching and control point VK sends an address completion message ANS' to the switching center VZA via the interface 5 as a reply to the start address message IAM' 1 that was sent. The switching center VZA forwards this to the switching node in the public communication network PSTN. Switching of a communication terminal equipment MS-A, MS-B, SA', SB' in the radio communication network domain of the switching center VZA or VZB requires no connection to either a public communication network PSTN or a mobile radio telephone network. The useful channels thus need not be routed via the respective switching center. The switching can occur via satellite UE. Controlled by messages for useful channel connections that the switching and control point VK make available.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims

I claim:

1. A method for controlling connection between a communication terminal equipment of a radio communication network and a further communication terminal equipment, wherein the radio communication network comprises at least one radio transmission unit controlled by at least one switching and control point, and wherein the switching and control point is respectively connected to a switching center via an interface, said method comprising the steps of:

determining at least one switching point address and a channel address for channel identification from data specifically associated with a radio communication network in the switching center based on a connection control request;

transmitting a channel connection message with the switching point address and the channel address from the switching center to the switching and control point via the interface;

evaluating the received channel connection message at the switching and control point and deciding whether connection control is initiated via the radio transmission unit in the radio communication network; and generating a connection between the communication terminal equipment via the radio transmission unit for the transmission of information, wherein the channel connection message is transmitted by the switching center only when the connection control for a channel connection can be implemented via the radio transmission unit by the switching and control point.

2. A method according to claim 1, wherein a network identifier is transmitted in the channel connection message for identification of a communication network.

3. A method according to claim 1 wherein the transmission of the channel connection message takes place according to central signaling system No. 7.

4. A method according to claim 3, wherein the transmission of the channel connection message takes place via an ISDN user part.

5. A method according to claim 3, wherein the transmission of a useful channel connection message takes place via a telephone user part.

6. A method according to claim 1, wherein at least the channel address of the channel is entered into a part of the channel connection message.

7. A method according to claim 1, wherein the channel connection message is separately transmitted as a national message which contains the channel address.

8. A method according to claim 1, wherein the switching and control point returns a message channel connection between the communication terminal equipment and the switching center regardless of whether connection control for a channel connection via the radio transmission unit can be implemented.

9. A method according to claim 1 wherein the radio communication network is a satellite communication network, and at least one satellite is employed as a radio transmission unit and the switching and control points are ground stations.

10. A method according to claim 1 wherein in the interface between the switching center and the switching and control point is a mobile radio telephone interface.

11. A radio communication system comprising at least one radio transmission unit connected to communication terminal equipment and at least one switching and control point, whereby the switching and control point is connected to a switching center via an interface, and further comprising:
- a means for determining at least a switching point address and a channel address for the channel identification from data specifically associated with a radio communication network located in the switching center;
- a means for transmitting a channel connection message for a channel connection with a switching point address and the channel address to the switching and control point located in the switching center; and
- a means for evaluating a channel connection message and determining whether connection control is initiated via the radio transmission unit in the radio communication network located in the switching and control point, wherein the means for transmitting the channel connection message only transmits the channel connection message from the switching center when the connection control for a channel connection can be implemented via the radio transmission unit by the switching and control point.

12. A radio communication system according to claim 11, wherein the switching sends the useful channel connection message according to central signaling system No. 7.

13. A radio communication system according to claim 11, wherein satellites are radio transmission units and the switching and control point are ground stations.

14. A radio communication system according to one of the claims 12 wherein the interface between the switching and control point and the switching center is fashioned as an interface according to a standardized GSM mobile radio telephone system.

15. A radio communication system according to one of the claims 11 wherein the channel connection message contains a network identifier.

* * * * *